US009080675B2

(12) United States Patent
Schubert et al.

(10) Patent No.: US 9,080,675 B2
(45) Date of Patent: Jul. 14, 2015

(54) GATE VALVE FOR BLOCKING A PIPE

(71) Applicant: Phönix Armaturen-Werke Bregel GmbH, Volkmarsen (DE)

(72) Inventors: Matthias Schubert, Hofgeismar (DE); Gunter Wodara, Bad Arolsen (DE); Hannes Kellermann, Volkmarsen (DE)

(73) Assignee: Phönix Armaturen-Werke Bregel GmbH, Volkmarsen (DE)

( * ) Notice: Subject to any disclaimer, the term of this patent is extended or adjusted under 35 U.S.C. 154(b) by 231 days.

(21) Appl. No.: 13/852,348

(22) Filed: Mar. 28, 2013

(65) Prior Publication Data

US 2013/0256575 A1    Oct. 3, 2013

(30) Foreign Application Priority Data

Mar. 31, 2012  (EP) ..................................... 12002382

(51) Int. Cl.
  *F16K 3/14*  (2006.01)
  *F16K 3/18*  (2006.01)
(52) U.S. Cl.
  CPC .... *F16K 3/18* (2013.01); *F16K 3/14* (2013.01)
(58) Field of Classification Search
  CPC ...................................... F16K 3/18; F16K 3/14
  USPC .................. 251/195, 193, 176, 175, 203, 197
  See application file for complete search history.

(56) References Cited

U.S. PATENT DOCUMENTS

| | | | | |
|---|---|---|---|---|
| 2,042,067 A | * | 5/1936 | Leach et al. | 137/246.13 |
| 2,325,802 A | * | 8/1943 | Schmidt et al. | 137/583 |
| 2,448,706 A | * | 9/1948 | Edwards | 251/175 |
| 2,476,711 A | * | 7/1949 | Edwards | 251/175 |
| 2,571,826 A | * | 10/1951 | Boyd | 251/175 |
| 2,868,495 A | * | 1/1959 | Lucas | 251/86 |
| 2,883,147 A | * | 4/1959 | Mirza et al. | 251/172 |
| 3,040,773 A | * | 6/1962 | McInerney | 137/556.3 |

(Continued)

FOREIGN PATENT DOCUMENTS

| DE | 759 211 C | 3/1953 |
|---|---|---|
| DE | 877 078 C | 5/1953 |

(Continued)

OTHER PUBLICATIONS

Translation of DE4218877 "Zimmermann" published on May 27, 1993, provided by the EPO and previously cited by the applicants.*

(Continued)

*Primary Examiner* — Kevin Murphy
*Assistant Examiner* — David Colon Morales
(74) *Attorney, Agent, or Firm* — Gifford, Krass, Sprinkle, Anderson & Citkowski, P.C.; Douglas L. Wathen

(57) ABSTRACT

A gate valve for blocking a pipe, wherein the gave valve comprises a valve body and a wedge, which is insertable into a wedge receptacle disposed in the valve body, wherein the wedge has a wedge plate on at least one side in the passage direction of the pipe, which is disposed on the wedge with a clearance in the direction of the center longitudinal axis of the pipe, wherein the wedge plate is adapted to be pressed by at least one elastic element against the wedge receptacle in the valve body, wherein the at least one elastic element is configured as an approximately circular-shaped circumferential bellows having a central opening.

13 Claims, 2 Drawing Sheets

(56) References Cited

U.S. PATENT DOCUMENTS

| | | | | |
|---|---|---|---|---|
| 3,136,330 | A * | 6/1964 | Dowling | 137/340 |
| 3,167,088 | A * | 1/1965 | McInerney | 137/375 |
| 3,204,924 | A * | 9/1965 | Bredtschneider | 251/174 |
| 3,215,399 | A * | 11/1965 | McInerney et al. | 251/195 |
| 3,266,769 | A * | 8/1966 | Shand | 251/172 |
| 3,356,334 | A * | 12/1967 | Scaramucci | 251/172 |
| 3,524,467 | A * | 8/1970 | Worley | 137/340 |
| 3,537,681 | A * | 11/1970 | Wrenshall | 251/193 |
| 3,604,089 | A * | 9/1971 | Karlsson | 29/890.127 |
| 4,062,515 | A * | 12/1977 | Bobo | 251/167 |
| 4,217,923 | A * | 8/1980 | Kindersley | 137/315.21 |
| 4,244,557 | A * | 1/1981 | Polhede et al. | 251/167 |
| 4,676,480 | A * | 6/1987 | Garceau et al. | 251/159 |
| 4,706,934 | A * | 11/1987 | Brown | 251/87 |
| 4,747,578 | A * | 5/1988 | Kivipelto et al. | 251/159 |
| 5,101,853 | A * | 4/1992 | Mailliet et al. | 137/242 |
| 5,247,964 | A * | 9/1993 | DeLange | 137/599.05 |
| 6,561,484 | B2 * | 5/2003 | Nakagawa et al. | 251/175 |
| 7,484,710 | B2 * | 2/2009 | Koester et al. | 251/160 |

FOREIGN PATENT DOCUMENTS

| | | |
|---|---|---|
| DE | 758 742 C | 3/1954 |
| DE | 11 86 711 B | 2/1965 |
| DE | 29 23 885 A1 | 12/1980 |
| DE | 37 39 483 A1 | 6/1989 |
| DE | 42 18 877 C1 | 5/1993 |

OTHER PUBLICATIONS

Translation of DE1186711 "Franz" published on Feb. 4, 1965, provided by the EPO and previously cited by the applicants.*
Translation of DE3739483 "Preussag" published on Jun. 1, 1989, provided by the EPO and previously cited by the applicants.*
Translation of DE1102511 "Klein" published on Mar. 16, 1961, provided by the EPO and previously cited by the applicants.*

* cited by examiner

GATE VALVE FOR BLOCKING A PIPE

CROSS-REFERENCE TO RELATED APPLICATION

This application claims priority of European Patent Application No. EP 12 002 382.5, filed Mar. 31, 2012.

FIELD OF THE INVENTION

The invention relates to a gate valve for blocking a pipe, wherein the gate valve includes a valve body and a wedge that is insertable into a wedge receptacle disposed in the valve body. The wedge has a wedge plate on at least one side in the direction of the passage of the pipe. The wedge plate is disposed on the wedge with a clearance therebetween, in the direction of the center longitudinal axis of the pipe. The wedge plate is adapted to be pressed against the wedge receptacle in the valve body by at least one elastic element.

Due to the clearance between the wedge plate and the wedge, the wedge plate is adapted to be pressed against the wedge receptacle by the elastic element.

A gate valve is known from the prior art. Gate valves commonly serve for blocking pipes in which liquid or gaseous media are transported. To this end, the gate valve is inserted into a valve body in a pipe, i.e. the pipe is flanged onto both sides of the valve body. The valve body has a spindle drive that is customarily motor-driven. At its end in the valve body, the spindle drive holds a wedge that is insertable into a wedge receptacle in the valve body by means of the spindle drive and in this respect blocks the pipe.

The problem with such gate valves is always generating the required sealing force in order to ensure that the pipe is indeed completely blocked against the medium transported inside of it. In this respect, it is already known that a wedge may have a wedge plate at least on one side, wherein the wedge plate is disposed with an axial clearance on the wedge. Hereby, "axial" means in the direction of the longitudinal axis of the pipe. This must be seen within the following context: The wedge is configured as a circular disc. The wedge plate that is received by the wedge is configured as a circular ring. It has already been pointed out that the wedge plate is received by the wedge with a clearance in the direction of the axis of the pipe. Now, in order to ensure that the pipe is indeed completely blocked for the purpose of impermeability, an elastic element is provided between the wedge plate and the wedge, which ensures that the wedge plate is held pressed against the wedge receptacle. Springs may be provided as elastic elements, which ensure that the wedge plate is pressed against the wedge receptacle. This means that the circular ring-shaped wedge plate is pressed against the seal seat in the wedge receptacle. However, the wedge plate is not only pressed against the seal seat of the wedge receptacle when the wedge has reached its closed position but also during the insertion process. The consequence of this is that when inserting the wedge into the wedge receptacle, the wedge plate already rests against the seal seat of the wedge receptacle. The respective seal seat of the wedge receptacle is usually formed by a circumferential seal disposed on the wedge receptacle, which is formed by the valve body, and by a correspondingly formed seal on the wedge plate. The seals can be configured as stainless steel matches in the form of metallic welded-on parts. If the wedge is inserted into the wedge receptacle and if the wedge plate is under tension in the axial direction of the pipe, the two seal surfaces will rub against each other when the wedge is inserted into the wedge receptacle. Since the elastic elements providing the pretension of the wedge plate relative to the wedge are very rigid, in order to ensure the best possible sealing, the frictional forces are also considerable. The consequence of this is that the seal surfaces are already worn out after only a few opening and closing processes, with the additional consequence that the pipe is no longer securely sealed off by the wedge.

SUMMARY OF THE INVENTION

The object underlying the invention is therefore to provide that the sealing force is only built up once the wedge is substantially completely received by the wedge receptacle and consequently the seal surfaces of the wedge receptacle and of the wedge plate rest against each other so that they substantially cover each other.

In order to solve the object, it is proposed according to the invention that the at least one elastic element is configured as an approximately circular-shaped circumferential bellows that has a central opening. The bellows, which is substantially ring-shaped, is located between the wedge and the wedge plate. During the pipe blocking process, a pressure will only build up on the pressure side of the pipe when the wedge has reached its end position. This pressure build-up ensures that the bellows is extended in the axial direction of the pipe, with the consequence that the wedge plate seal rests under pressure on the wedge receptacle seal, only once the wedge is closed. In other words, this means that the annular wedge plate with its annular seal is only pressed onto the annular seal of the wedge receptacle when the wedge has reached its end position and the bellows is spread by the pressure present in the pipe, with the consequence that due to the spreading of the bellows, which is also configured with a substantially annular shape, the wedge plate is pressed with its seal against the annular seal in the wedge receptacle provided by the valve body.

It is more specifically provided that the wedge plate is detachably connectable to the wedge. This must be seen in the context that the wedge plate is a wear part that must be easily replaceable if required. Hereby, it is more specifically provided that the wedge plate is connected to the wedge by a bayonet mount.

According to another feature of the invention, the bellows is formed as a metallic bellows. The metallic bellows may be formed as a corrugated bellows with at least one corrugation (preferably three corrugations). The bellows is connected, more specifically welded, at its end, preferably at the outer edge, with the wedge on the one side and with the wedge plate on the other side, so as to be respectively sealed against media.

Now, if the wedge plate must be replaced due to wear, it is merely necessary to undo the weld seam of the bellows in the area of the transition from the bellows to the wedge plate, in order to take the wedge plate out of the bayonet mount. However, it is also conceivable to undo the weld seam for connecting the bellows to the wedge plate, in order to take the wedge plate and the bellows out of the bayonet mount.

The corrugated bellows preferably has three corrugations, one corrugation being oriented outward and two corrugations being oriented inward, i.e. toward the center longitudinal axis of the pipe. In this respect, the bellows has a meander-shaped cross-section.

The operating mode of the seal of the wedge via the wedge plate by means of the bellows disposed between the wedge and the wedge plate is such that when the wedge has taken up its end position in the closed position, the bellows is extended in the axial direction of the pipe by the pressure of the medium present in the pipe and thus also in the valve body, with the consequence that the wedge plate, which is received by the wedge with a corresponding clearance, is pressed with its seal against the seal of the wedge receptacle of the valve body.

Due to the central opening in the bellows, it is also achieved that the inner space of the bellows is always washed out by the medium, so that there can be no accumulation of dirt in the long run. This is contrary to the prior art, in which springs are provided as elastic elements for spreading the wedge plate relative to the wedge, wherein it has been seen that such springs get clogged so that during the insertion process of the wedge, the seal of the wedge plate is submitted to an increased frictional force against the seal of the wedge receptacle and thus to increased wear since the wedge plate is not axially movable or only to a minor extent.

DETAILED DESCRIPTION OF THE INVENTION

Figure 2:
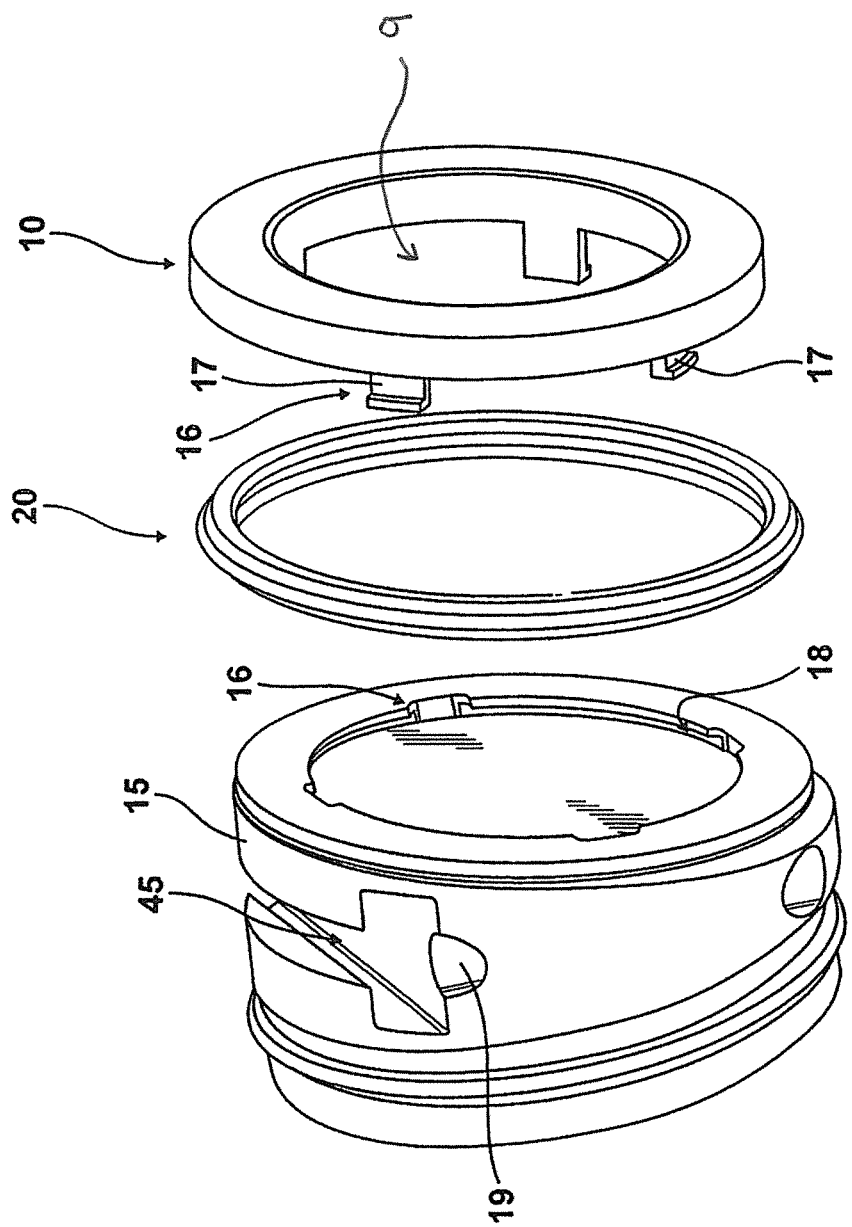
FIG. 2 is an exploded view of the construction of the wedge with the wedge plate and the bellows.

The gate valve as a whole is labeled 1; only the valve body 2 is shown, not the spindle drive. The valve body 2 includes the wedge receptacle 5 in the area of the passage 3. The spindle drive 40, which is only partially shown, serves to move the wedge 15 in the direction of the double arrow 30. In order to connect the spindle drive 40 to the wedge 15, the wedge has a corresponding receptacle 45. As can be seen in FIG. 2, the wedge has two openings 19 for receiving guide rods (not shown) in the valve body 2. The wedge receptacle in the valve body is substantially shaped as a circular ring and has a seal 7 on its side facing the wedge plate 10, thus forming a seal seat. The wedge plate 10 comprises a seal 11, which corresponds to the seal 7. The wedge plate 10 is received by the wedge 15 with a clearance x in the axial direction of the gate valve passage (arrow 12). The bellows 20 is located between the wedge 15 and the wedge plate 10. The bellows 20 has three corrugations, wherein two of the corrugations are oriented in the direction of the center longitudinal axis of the gate valve passage opening (arrow 12) and one is oriented in the opposite direction. In this respect, the bellows 20 has a meander-shaped course. The bellows 20 is connected with its ends, respectively at the outer edge 21 and 22, with the wedge plate and the wedge, wherein the connection is configured as a welded connection when the bellows 20 is a metallic bellows.

Figure 1:
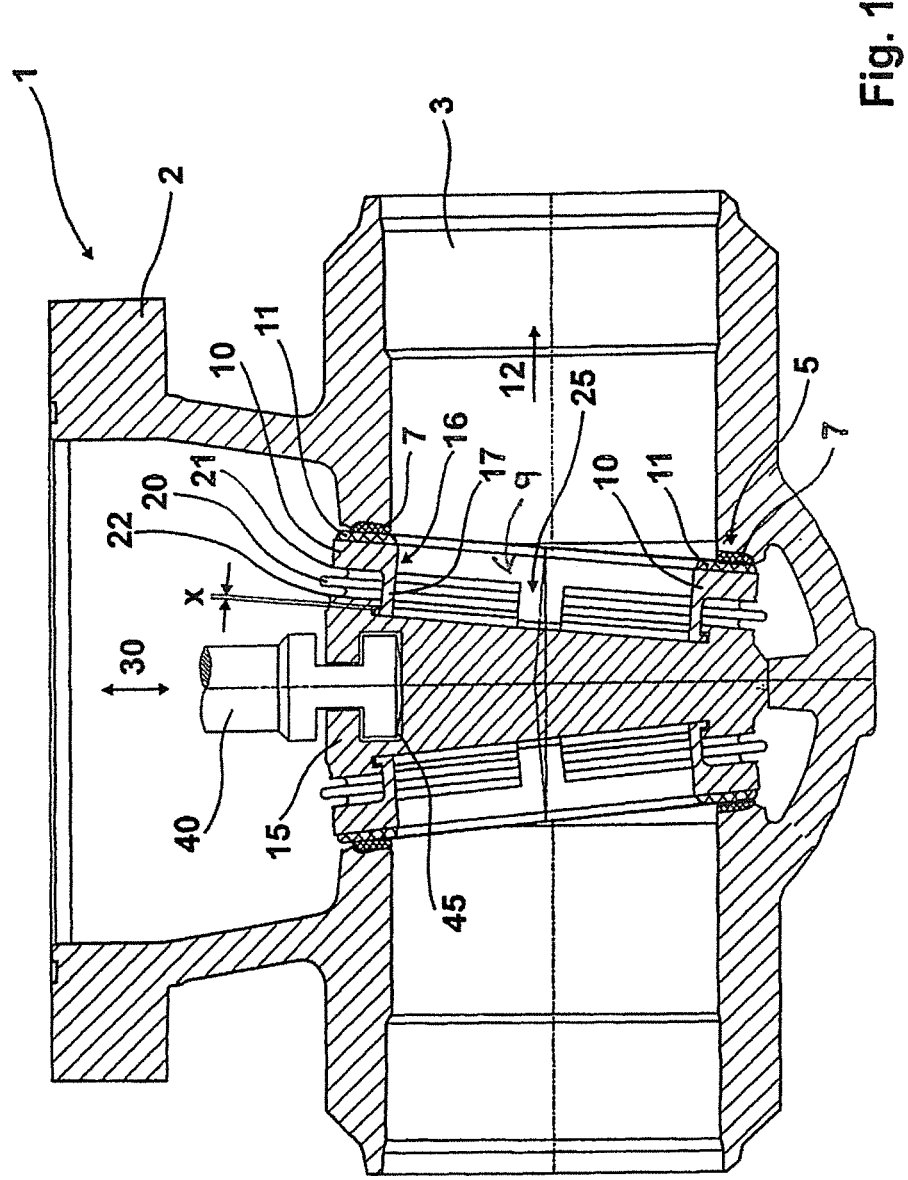
FIG. 1 is a cross-sectional view of a gate valve, wherein the spindle drive for the wedge is only partially shown.

It has already been pointed out that the wedge plate 10 is received by the wedge with a clearance x The wedge plate 10 is connected with the wedge 15 via a bayonet mount, wherein the clearance x is formed by the bayonet mount. The bayonet mount 16 comprises several, more specifically four fingers 17, which engage with a ring-shaped undercut 18 in the wedge. For explanation purposes, reference is made in this respect to FIG. 2. The circular ring-shaped fingers are hereby disposed on the wedge plate 10 in such a manner that they are led past the inner side of the bellows. The bellows 20 has a central opening 25, which substantially corresponds to the inner diameter of the wedge plate 10. As shown in FIGS. 1 and 2, the wedge plate 10 has an opening 9 defined therethrough that allows a medium to reach the central opening 25 of the bellows 20. When the wedge has reached its closed position as shown in FIG. 1, the bellows 20 is spread due to the internal pressure in the gate valve passage, with the consequence that the wedge plate 10 with the seal 11 is pressed against the seal 7 of the wedge receptacle 5. Hereby, the clearance x is displaced to the opposite side of fingers 17 of the wedge plate 10.

If the wedge 15 is pulled out of the closed position, the bellows will arrive again at its initial position at the moment in which there is the same pressure on both sides of the wedge, with the consequence that the wedge plate 10 is hereby pulled against the wedge 15 due to the tension of the bellows 20 and occupies a position as shown in FIG. 1. This means that the bellows is pre-tensioned in such a manner that the wedge plate is pulled by the bellows against the wedge when the pressure is equalized. In that moment, the pressure between the seals 7 and 11 is reduced, with the consequence that during the further opening of the gate valve, the seals 7 and 11 only lightly slide along each other and are thus only submitted to minor wear.

REFERENCE NUMBERS 1 gate valve
2 valve body
3 passage
5 wedge receptacle
7 seal on the valve body
9 opening in wedge plate
10 wedge plate
11 seal on the wedge plate
12 arrow
15 wedge
16 bayonet mount
17 finger of the bayonet mount
18 undercut in the wedge plate as part of the bayonet mount
19 opening for the guide rod
20 bellows
21 outer edge toward the wedge plate
22 outer edge toward the wedge
25 opening
30 double arrow
40 spindle drive
45 receptacle for spindle drive
x clearance

The invention claimed is:

1. A gate valve for blocking a pipe, the pipe having a central longitudinal axis, the gate valve comprising:
   a valve body having a wedge receptacle defined therein;
   a wedge selectively insertable into the wedge receptacle in the valve body to an end position, the wedge having at least one side;
   a wedge plate disposed on the at least one side of the wedge, the wedge plate being disposed on the wedge with a clearance defined therebetween, the clearance being generally in the direction of the axis of the pipe, the wedge plate having an opening therethrough;
   at least one elastic element disposed in the clearance between the wedge plate and the wedge, the at least one elastic element being a generally circular-shaped circumferential bellows having a central opening;
   wherein when the wedge is in the end position and a medium from the pipe flows through the opening in the wedge plate into the central opening of the bellows causing a pressure acting on the bellows, the bellows is expanded by the pressure to seal the wedge plate against the wedge receptacle.

2. A gate valve in accordance with claim 1, wherein:
   the wedge plate is detachably connected to the wedge.

3. A gate valve in accordance with claim 2, wherein:
   the wedge plate is connected to the wedge by a bayonet mount.

4. A gate valve in accordance with claim 1, wherein:
the bellows is a metallic bellows.

5. A gate valve in accordance with claim 1, wherein:
the bellows has a first edge sealed to the wedge and a second edge sealed to the wedge plate.

6. A gate valve in accordance with claim 1, wherein:
the bellows is a corrugated bellows.

7. A gate valve in accordance with claim 6, wherein:
the bellows has at least one corrugation.

8. A gate valve in accordance with claim 6, wherein:
the bellows has three corrugations.

9. A gate valve in accordance with claim 6, wherein:
the bellows has corrugations that are oriented outwards and inwards.

10. A gate valve in accordance with claim 1, further comprising:
at least one seal disposed between the wedge plate and the wedge receptacle.

11. A gate valve in accordance with claim 10, wherein the at least one seal includes a circumferential seal on the wedge plate and a circumferential seal on the wedge receptacle.

12. A gate valve in accordance with claim 1, further comprising:
a spindle drive connected to the wedge.

13. A gate valve in accordance with claim 1, wherein:
the bellows has a first edge welded to the wedge and a second edge welded to the wedge plate.

\* \* \* \* \*